April 9, 1957 R. C. DILLON 2,788,322
THERMAL DIFFUSION APPARATUS
Filed June 25, 1954
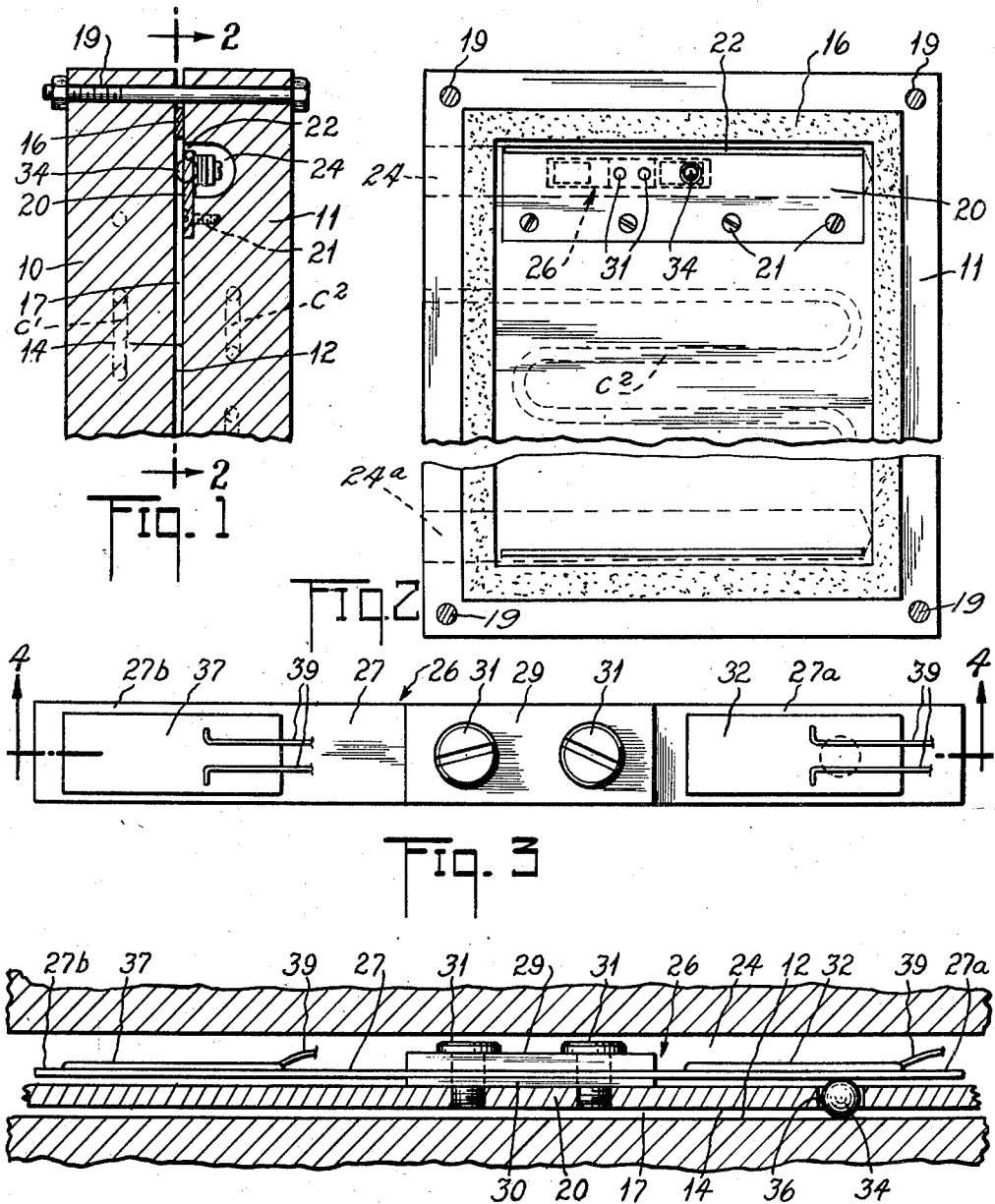
INVENTOR.
RICHARD C. DILLON
BY
Campbell, Brumbaugh, Free & Graves
ATTORNEYS

United States Patent Office 2,788,322
Patented Apr. 9, 1957.

2,788,322

THERMAL DIFFUSION APPARATUS

Richard C. Dillon, Cleveland, Ohio, assignor to The Standard Oil Company, Cleveland, Ohio, a corporation of Ohio Application June 25, 1954, Serial No. 439,405

4 Claims. (Cl. 210—176)

The present invention relates to a new and useful improvement in apparatus for separating difficultly separable mixtures by thermal diffusion.

It has been known for some time that it is possible to separate different materials in a fluid mixture by confining the mixture within a space between two closely adjacent wall surfaces, one of which is maintained at a temperature higher than the other. In separating different materials in a liquid mixture, the spacing between the opposed walls of a thermal diffusion separation chamber becomes very critical, particularly when the apparatus is used to carry out the separation in a continuous manner. Thus, for example, under a given set of operating conditions, i. e., at elevated temperature and possibly elevated pressure, it may be determind that a spacing of 0.01" between the opposed wall surfaces is optimum and that the degree or rate, or both, of separation will fall off rapidly if the spacing increases appreciably. On the other hand, if the spacing becomes appreciably smaller, movement of the mixture or any of its components through the separation chamber may be seriously impeded and possibly stopped.

In considering these critical requirements as to spacing between opposed chamber forming wall surfaces, it is also important to bear in mind that a thermal diffusion apparatus must of necessity be assembled at ambient temperatures and that good thermal conductivity of the wall material, which is essential for the economical operation, is usually accompanied by a high modulus of thermal expansion. The result of this is that even though the spacing between the wall surfaces forming the chamber may be very carefully adjusted during assembly, it may vary considerably upon being put into operation, inasmuch as it is by no means unusual to maintain one of the wall surfaces at a temperature of the order of 300° or even 600° F. and the other at temperatures close to the freezing point.

Operations carried out with various types of apparatus have at one time or another shown some considerable variation in results that could be explained only by variations in the spacings between the chamber forming walls. This may readily be appreciated upon considering the expansion, and resulting bowing, of a copper or brass wall having an area of about ten square feet and initially spaced uniformly 0.01" from an opposed wall while at ambient temperature, when its temperature is raised to say 300 or 600° F. while the other wall is cooled. The present invention is addressed to overcoming this problem.

In essence, the improvement to which this invention is directed comprises incorporating into a plate or tubular type thermal diffusion apparatus, a device for measuring, preferably continuously, the actual spacing between the chamber-forming wall surfaces thereof to enable changes in the spacing of the walls to be detected and to permit the spacing of the walls to be adjusted to a desired value. In essence, such a device comprises a plunger that extends through an aperture in one of the wall surfaces. One extremity of the plunger abuts the opposite wall surface and the other extremity engages a free arm of a resilient cantilever beam, the flexing of which is measured by a strain gage of the type described in "Chemical Engineering," September 1953, pages 217–228, and transmitted to a suitably calibrated indicator. Means, which may be manual or automatic, are preferably also provided for adjusting the spacing between the opposed wall surfaces in response to the signal of the strain gage indicator.

In the preferred embodiment of the apparatus of the invention, the measuring mechanism is applied, as a matter of convenience, to an elongated strip member mounted flush with one wall surface and having a cavity behind it, e. g., passageway for liquid. The cavity provides a convenient space in which to house the various elements of a strain gage mounted directly on the back of the elongated strip member. The cantilever beam is preferably of steel or other flexible material that is resistant to temperature changes and inert to the liquid mixture and its components. It is mounted rigidly to, but elevated from, the elongated strip member at its center so that both extremities thereof are free to flex. A strain gage, consisting essentially of a flat coil of resistance wire, preferably imbedded in an adhesive or plastic material, is secured to one free arm of the beam and a plunger, preferably a metal sphere such as a ball bearing, is fitted into an aperture through the elongated strip member and held between the opposite wall member and the underside of the arm of the cantilever beam. The other arm of the cantilever beam is provided with a dummy strain gage in the same manner as the first arm. This arm, however, is not provided with a plunger.

The opposed wall surfaces of a thermal diffusion apparatus are sealed and spaced apart by a resilient and heat resistant gasket to form a separation chamber and are held together by any suitable means such as bolts, clamps or the like. When the strain gage indicates, by suitable outside connections to a Wheatstone bridge or the like, that the spacing between the opposed wall surfaces has become either too small or too large, the tension on the bolts or clamps is suitably adjusted to bring the spacing to the correct and desired distance.

It will readily be appreciated that the provision of one or more measuring means of the type described in a thermal diffusion apparatus will have some very considerable advantages, primarily in indicating positively to the operator whether the spacing within the separation chamber is correct or needs correction.

These advantages, as well as the utility, of the invention will become apparent from the following detailed description made with reference to the accompanying drawing, wherein:

Figure 1 is a schematic and fragmentary view in cross section of one end of a thermal diffusion apparatus constructed in accordance with the preferred embodiment of the invention;

Figure 2 is a view taken on section line 2—2 of Figure 1, but including the essential features of construction shown in Figure 1;

Figure 3 is a detailed view, on an enlarged scale, of the measuring mechanism illustrated in plan view in Figure 2; and Figure 4 is a view in cross section taken on section line 4—4 of Figure 3.

The thermal diffusion apparatus shown schematically in Figures 1 and 2 consists essentially of two plate members 10 and 11 having smooth wall surfaces 12 and 14, respectively, which are spaced apart by means of a resilient gasket 16 to form a thermal diffusion separation chamber 17. The walls may be held together by any suitable means such as bolts 19 or the like and provided with any desired means such as the passages $C^1$, $C^2$ for heating and cooling agents, for maintaining them at different temperatures during operation.

In the construction illustrated in Figures 1 and 2, one of the walls 11 is provided with a cavity in its chamber forming face 14 which is covered in large part by an elongated strip member 20 secured to the wall member 11 by screws 21 or the like in such manner that one face thereof is flush with the face 14 of the wall member 11. One edge of the strip member 20 is spaced slightly from one edge of the cavity to form an elongated slot or opening 22 through which liquid may pass into or out of the separation chamber 17 from or to a lateral conduit 24 formed by the cavity and the partially covering portion of the elongated strip member 20. A corresponding inlet or outlet 24a which communicates with an elongated slot or opening is also provided to permit liquid to pass into or out of the separation chamber 17.

The measuring mechanism, shown generally at 26 in Figure 2 and in greater detail in Figures 3 and 4, includes a double cantilever beam 27 mounted rigidly at the center between top and bottom base plates 29 and 30 respectively to the elongated strip member 20 by means of screws or the like 31. An active strain gage 32 is cemented to the upper surface of one arm 27a of the cantilever beam 27 and the underside thereof abuts against a ball bearing plunger 34 freely movable within an aperture 36 in the elongated strip member 20 and abutting against the opposed wall surface 12. A similar but dummy strain gage 37 is cemented to the upper surface of the other arm 27b of the cantilever beam 27. Both strain gages 32 and 37 are provided with two coil terminals 39 which may, in accordance with well-known practice, be connected to a calibrated indicating device outside the apparatus by way of a Wheatstone bridge to signal changes in the spacing between the opposed chamber forming walls 12 and 14 as sensed by the ball bearing plunger 34.

The active strain gage 32 may readily be calibrated by taking a reading when a flat surface is held against the surface 14 to press the ball bearing plunger 34 into the aperture 36 and thereby apply maximum bending to the arm 27a of the cantilever beam 27. This procedure will give the proper reading for a zero spacing between the wall surfaces 12 and 14. By successively placing rings of preselected thicknesses, e. g., 0.01" and 0.02" thick rings, around the aperture of the ball bearing plunger 34 and then placing a flat surface thereon, the gage will be calibrated for wall spacings of said preselected values. In assembling the thermal diffusion apparatus, the bolts 19 or the like are tightened until the gasket 16 is compressed the amount necessary to have the strain gages give the preselected reading. During operation of the apparatus, particularly at the beginning when one of the walls is first heated and the other cooled to initiate the required temperature gradient, any changes in spacing between the opposed wall surfaces will instantly and visually be indicated so that suitable adjustment may be effected by operation of the bolts. The dummy strain gage serves the very useful function of compensating for any change in reading that might otherwise be obtained merely because of a change in temperature, rather than a change in the spacing between the opposed chamber forming wall surfaces.

It is to be understood that various modifications will readily occur to those skilled in the art upon reading this description. All such modifications are intended to be included within the scope of the invention as defined in the accompanying claims.

I claim:

1. Thermal diffusion apparatus essentially comprising two walls the opposed faces of which are spaced apart to form a substantially uniform, narrow separation chamber, means for relatively heating and cooling said walls to maintain a temperature differential across said chamber, means to introduce liquid into and discharge liquid from said chamber, one of the walls having an aperture in its chamber-forming face, a plunger extending into said aperture and having one extremity thereof in abutment with the opposite face of the other wall, a flexible beam having a free arm laterally in abutment with the opposite extremity of the plunger, and a strain gage on said flexible beam sensitive to flexing of the beam to detect changes in the spacing between said faces resulting from said temperature differential.

2. Thermal diffusion apparatus essentially comprising two liquid-impervious, stationary walls the opposed faces of which are smooth and spaced apart a critical distance to form a substantially uniform, narrow separation chamber, means for relatively heating and cooling said walls to maintain a temperature differential across said chamber, means to introduce liquid into and discharge liquid from said chamber, one of the walls having an aperture in its chamber-forming face, a substantially incompressible sphere extending into said aperture and in abutment with the opposite face of the other wall, a flexible double cantilever beam having one free arm laterally in abutment with said sphere, a strain gage on said flexible beam sensitive to flexing of the beam to detect changes in the spacing between said faces resulting from said temperature differential, and means for adjusting the spacing between the wall faces in response to the flexing of the beam sensed by the strain gage.

3. Liquid thermal diffusion apparatus essentially comprising two liquid-impervious, stationary walls the opposed faces of which are smooth and spaced apart a critical distance to form a substantially uniform, narrow separation chamber, means for relatively heating and cooling said walls to maintain a temperature differential across said chamber, means to introduce liquid into and discharge liquid from said chamber, one of the walls having a cavity behind one of the chamber-forming wall faces and an aperture in said wall face communicating with said cavity, a cantilever beam within the cavity, said beam being mounted rigidly at its center and having oppositely facing arms, one of said arms being over said aperture, a ball bearing movable in the aperture and held between said arm and the wall face opposite the aperture, a strain gage on said arm sensitive to flexing of the beam to detect changes in the spacing between said faces resulting from said temperature differential, a dummy strain gage on the other arm, and means for adjusting the spacing between the wall faces in response to the flexing of the beam sensed by the strain gage.

4. Liquid thermal diffusion apparatus essentially comprising two substantially parallel, liquid-impervious, stationary walls, the opposed faces of which are smooth and spaced apart a critical distance to form a substantially uniform narrow separation chamber, means for relatively heating and cooling said walls to maintain a temperature differential across said chamber, means to introduce liquid into and discharge liquid from said chamber, inlet and outlet passageways communicating with the chamber, at least one of said passageways comprising an elongated cavity in the face of one of the walls having a longitudinal axis transversely of the direction of flow of liquid within the chamber; an elongated strip member in the cavity flush with the wall face and forming an elongated and narrow opening lengthwise thereof; a double ended cantilever beam secured to the strip member, said beam having two flexible arms; a strain gage bonded to each arm; a ball bearing held between one of said arms and the wall face opposite the elongated strip member, said strip member having an aperture under said one of said arms to receive said ball bearing, thereby to actuate said strain gage to detect a change in the spacing of said walls.

References Cited in the file of this patent

UNITED STATES PATENTS

| | | |
|---|---|---|
| 2,321,322 | Ruge | June 8, 1943 |
| 2,344,642 | Ruge | Mar. 21, 1944 |
| 2,439,146 | Ruge | Apr. 6, 1948 |
| 2,541,071 | Jones et al. | Feb. 13, 1951 |
| 2,688,873 | Burris-Meyer | Sept. 14, 1954 |